United States Patent
Miyadoh

(10) Patent No.: US 12,462,588 B2
(45) Date of Patent: Nov. 4, 2025

(54) DRIVER STATE DETERMINATION APPARATUS

(71) Applicant: TOYOTA JIDOSHA KABUSHIKI KAISHA, Aichi (JP)

(72) Inventor: Takahiro Miyadoh, Toyota (JP)

(73) Assignee: TOYOTA JIDOSHA KABUSHIKI KAISHA, Aichi (JP)

( * ) Notice: Subject to any disclaimer, the term of this patent is extended or adjusted under 35 U.S.C. 154(b) by 0 days.

(21) Appl. No.: 18/911,246

(22) Filed: Oct. 10, 2024

(65) Prior Publication Data

US 2025/0139995 A1    May 1, 2025

(30) Foreign Application Priority Data

Oct. 26, 2023    (JP) .................. 2023-184108

(51) Int. Cl.
| | |
|---|---|
| *G06V 20/59* | (2022.01) |
| *G06V 10/24* | (2022.01) |
| *G06V 10/98* | (2022.01) |
| *G06V 40/16* | (2022.01) |
| *G07C 5/02* | (2006.01) |

(52) U.S. Cl.
CPC ............ *G06V 20/597* (2022.01); *G06V 10/24* (2022.01); *G06V 10/987* (2022.01); *G06V 40/166* (2022.01); *G07C 5/02* (2013.01)

(58) Field of Classification Search
CPC .... G06V 20/597; G06V 10/987; G06V 10/24; G06V 40/166; G07C 5/02
USPC ........................... 348/143, 148; 382/118, 103
See application file for complete search history.

(56) References Cited

U.S. PATENT DOCUMENTS

| | | |
|---|---|---|
| 9,805,275 B2 | 10/2017 | Okuda |
| 10,525,981 B2 | 1/2020 | Matsumura |
| 10,579,056 B2 | 3/2020 | Matsumura |
| 10,649,452 B2 | 5/2020 | Ichikawa et al. |
| 10,706,299 B2 | 7/2020 | Matsumura |
| 10,814,880 B2 | 10/2020 | Kishi |
| 10,895,875 B2 | 1/2021 | Hashimoto et al. |
| 10,915,100 B2 | 2/2021 | Matsushita et al. |
| 11,173,919 B2 | 11/2021 | De Weser et al. |
| 2021/0039713 A1 | 2/2021 | Hara |
| 2025/0022292 A1* | 1/2025 | Omi .................... G06V 20/597 |

FOREIGN PATENT DOCUMENTS

JP    2021-026626 A    2/2021

* cited by examiner

*Primary Examiner* — Sherrie Hsia
(74) *Attorney, Agent, or Firm* — HAUPTMAN HAM, LLP

(57) ABSTRACT

A driver state determination apparatus determines the state of a driver's face based on an image captured by a driver monitoring camera provided for the steering wheel. The device comprises a driver state determination unit that determines the driver's state from the image and a position change information acquisition unit that acquires position change information of the steering wheel. The driver state determination unit estimates the position of the driver's face in the image after the position change based on the position of the driver's face in the image before the position change and the position change information. It then determines the driver's state from the estimated position of the driver's face and the image after the position change.

6 Claims, 4 Drawing Sheets

DRIVER STATE DETERMINATION APPARATUS

CROSS-REFERENCE TO RELATED APPLICATIONS

This application is based upon and claims the benefit of priority from Japanese Patent Application No. 2023-184108, filed on Oct. 26, 2023, the entire contents of which are incorporated herein by reference.

TECHNICAL FIELD

The present disclosure relates to a driver state determination apparatus.

BACKGROUND

Conventionally, as a technical document related to a driver state determination apparatus, Japanese Patent Application Laid-Open No. 2021-026626 is known. This publication discloses starting a request for the driver to hold the steering wheel when detecting a posture movement of the driver and not detecting the holding of the steering wheel by the driver during an automated driving mode.

SUMMARY

Incidentally, a driver monitoring camera used to determine the state of the driver is often provided on the steering column. In this case, when the driver changes the position of the steering wheel, the position of the driver monitoring camera also changes, resulting in a problem where it takes time to determine the state of the driver.

According to an aspect of the present disclosure, there is provided a driver state determination apparatus that determines the state of the driver's face of a vehicle based on an image captured by a driver monitoring camera provided for the steering wheel of the vehicle. The driver state determination apparatus includes a driver state determination unit that determines the state of the driver based on the image captured by the driver monitoring camera, and a position change information acquisition unit that acquires position change information of the steering wheel when a position change of the steering wheel is performed. The driver state determination unit estimates the position of the driver's face in the image after the position change based on the position of the driver's face in the image before the position change of the steering wheel and the position change information of the steering wheel, and determines the state of the driver from the estimated position of the driver's face and the image after the position change.

In the driver state determination apparatus according to one aspect of the present disclosure, the driver state determination unit determines whether the state of the driver is an abnormal driver state based on the position change information of the steering wheel and the image captured by the driver monitoring camera, and makes it less likely to determine that the state of the driver is an abnormal driver state when the position change of the steering wheel is performed compared to when the position change of the steering wheel is not performed.

According to an aspect of the present disclosure, it is possible to suppress the time taken to determine the state of the driver caused by the position change of the steering wheel provided with the driver monitoring camera.

DETAILED DESCRIPTION

Hereinafter, embodiments of the present disclosure will be described with reference to the drawings.

Figure 1:
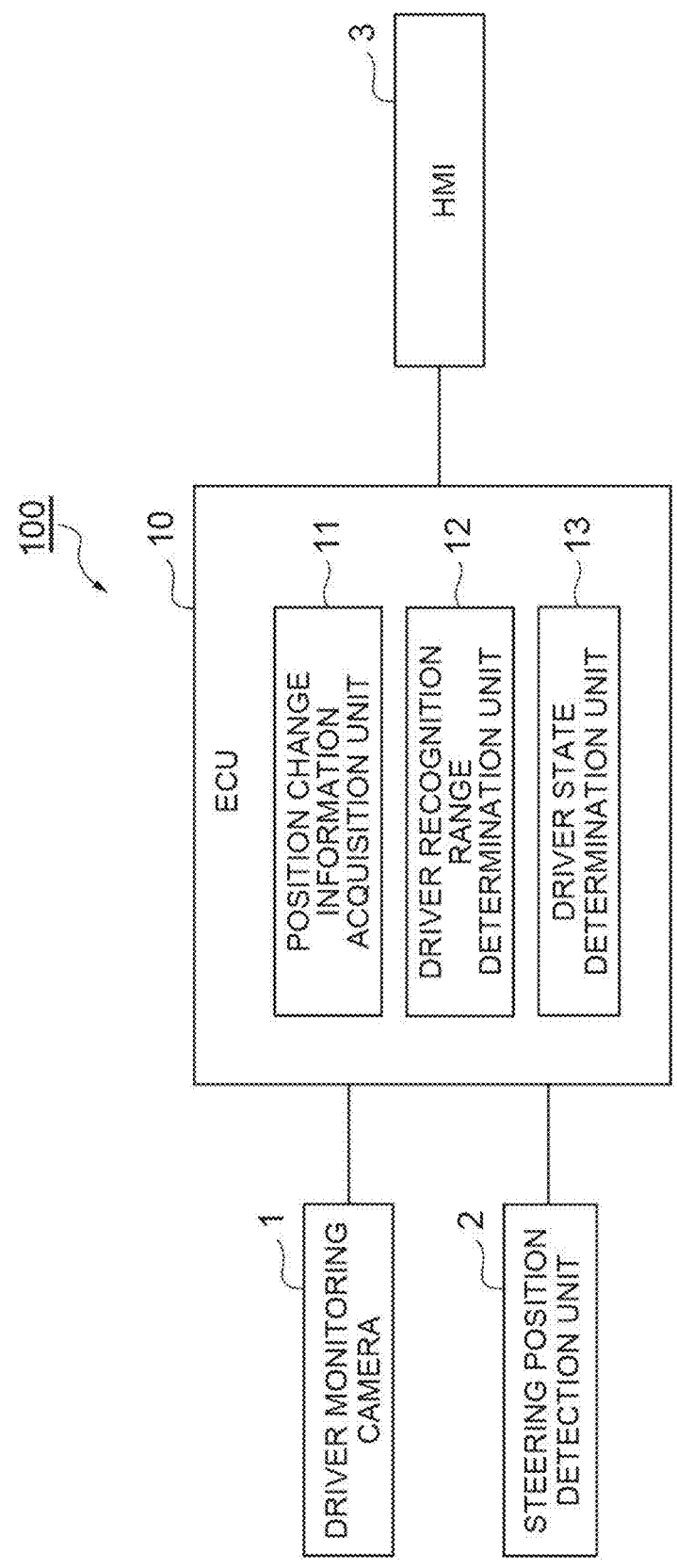
FIG. 1 is a block diagram showing a driver state determination apparatus according to an embodiment.

FIG. 1 is a block diagram showing a driver state determination apparatus 100 according to an embodiment. The driver state determination apparatus 100 shown in FIG. 1 is mounted in a vehicle and determines the state of the driver of the vehicle. The driver state determination apparatus 100 determines whether the driver is in a distracted state using, for example, an image of the driver's face captured by a driver monitoring camera 1.

As shown in FIG. 1, the driver state determination apparatus 100 includes an electronic control unit (ECU) 10 that generally manages the device. The ECU 10 is an electronic control unit having a central processing unit (CPU) and a storage unit. The storage unit includes, for example, a read-only memory (ROM), a random-access memory (RAM), an electrically erasable programmable read-only memory (EEPROM), and the like.

In the ECU 10, for example, various functions are implemented when the CPU executes a program stored in the storage unit. The ECU 10 may include a plurality of electronic units. The ECU 10 is connected to the driver monitoring camera 1, a steering position detection unit 2, and a human-machine interface (HMI) 3.

The driver monitoring camera 1 is a camera for imaging the driver. The driver monitoring camera 1 can be a digital camera having an imaging element such as a charge-coupled device (CCD) or a complementary metal-oxide-semiconductor (CMOS) image sensor.

The driver monitoring camera 1 is provided on the steering wheel of the vehicle. The installation method of the driver monitoring camera 1 is not limited as long as it is provided integrally with the steering wheel. The driver monitoring camera 1 is provided, for example, on the cover of the steering column and images the driver's head at a predetermined frame rate. The driver monitoring camera 1 may be provided integrally with the steering wheel. The driver monitoring camera 1 transmits the image of the driver to the ECU 10.

The steering position detection unit 2 detects the position of the steering wheel of the vehicle. The steering position detection unit 2 includes, for example, a tilt sensor and a telescopic sensor. The tilt sensor is a sensor that detects the vertical position of the steering wheel. The telescopic sensor is a sensor that detects the front-rear position of the steering wheel. The steering position detection unit 2 detects the position of the steering wheel based on the detection results of the tilt sensor and the telescopic sensor. The steering position detection unit 2 transmits steering position information related to the position of the steering wheel to the ECU 10.

The HMI 3 is an interface for inputting and outputting information between the ECU 10 and the driver. The HMI 3 includes, for example, a display, a speaker, and the like provided in the vehicle cabin. The HMI 3 performs an image output of the display and an audio output from the speaker in response to a control signal from the ECU 10. The display may be a multi-information display (MID) or a head-up display (HUD). The HMI 3 may include various indicators.

Next, the functional configuration of the ECU 10 will be described. As shown in FIG. 1, the ECU 10 includes a position change information acquisition unit 11, a driver recognition range determination unit 12, and a driver state determination unit 13.

The position change information acquisition unit 11 acquires position change information of the vehicle's steering wheel when a position change of the steering wheel is performed. The position change information acquisition unit 11 determines whether a position change of the steering wheel of the vehicle is performed based on the steering position information detected by the steering position detection unit 2. The position change information acquisition unit 11 determines that a position change of the steering wheel of the vehicle has been performed, for example, when the vertical position or the front-rear position of the steering wheel has been changed by a certain amount or more.

When the position change information acquisition unit 11 determines that a position change of the steering wheel of the vehicle has been performed, it acquires the position change information of the steering wheel based on the steering position information detected by the steering position detection unit 2 before and after the determination. The position change information includes, for example, the steering position information before the position change and the steering position information after the position change.

The driver recognition range determination unit 12 determines whether the position of the steering wheel has deviated from the driver recognition range due to the position change of the steering wheel when the position change information acquisition unit 11 determines that a position change of the steering wheel has occurred.

The driver recognition range is a preset range used to determine whether the driver monitoring camera 1 has become unable to image the driver's face due to the position or orientation change of the steering wheel. In other words, when the position of the steering wheel is within the driver recognition range, it can be inferred that the driver monitoring camera 1 is imaging the driver's face. The driver recognition range is a three-dimensional range including a certain range in the up-down and front-rear directions of the steering wheel. The driver recognition range determination unit 12 determines whether the steering wheel has deviated from the driver recognition range based on the steering position information detected by the steering position detection unit 2.

The driver state determination unit 13 determines the state of the driver of the vehicle based on the image captured by the driver monitoring camera 1. The driver state determination unit 13 determines, for example, whether the driver is in a distracted state based on the image of the driver's face. The driver state determination unit 13 may determine whether the driver is in a state of looking away, such as looking at a mobile device or other objects, or whether the driver is in a drowsy state or an intoxicated state.

When the position change information acquisition unit 11 determines that a position change of the steering wheel has been performed, the driver state determination unit 13 estimates the position of the driver's face in the image after the position change based on the position of the driver's face in the image before the position change of the steering wheel captured by the driver monitor camera 1 and the position change information of the steering wheel.

Figure 2:
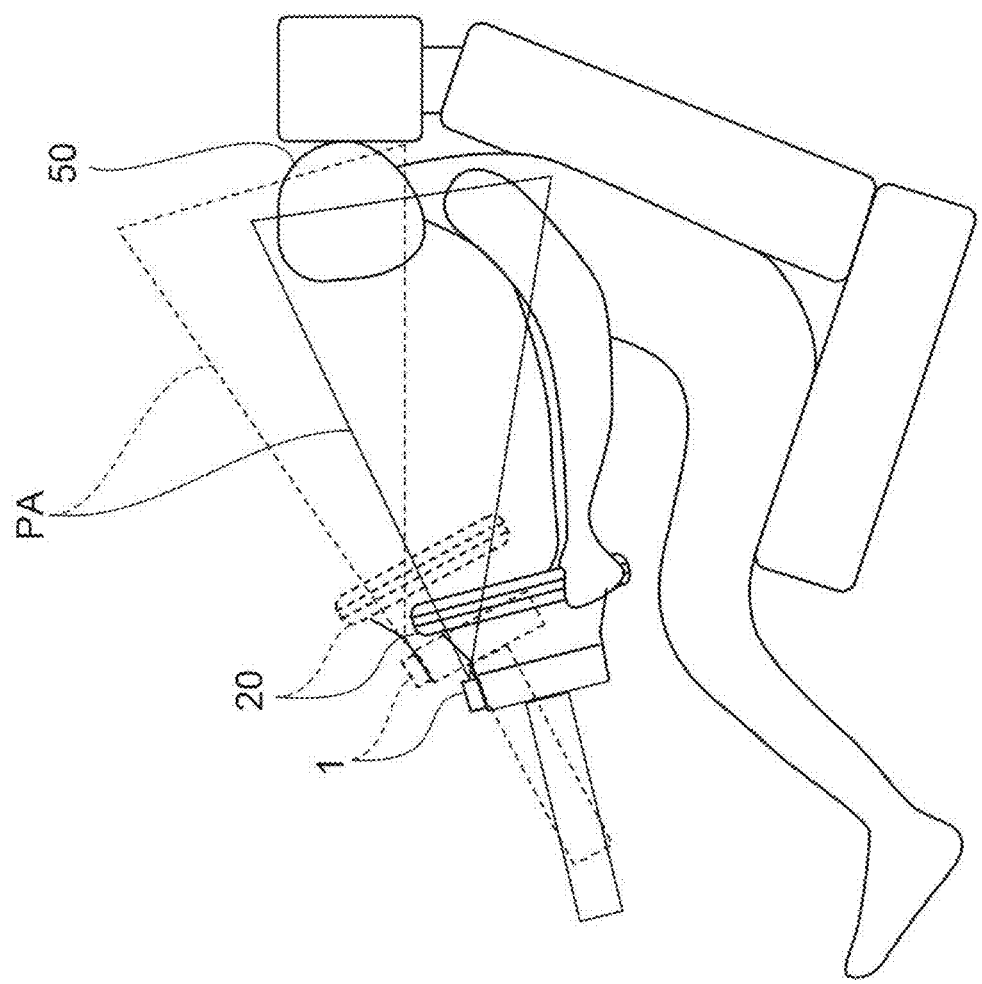
FIG. 2 is a diagram for explaining the change in the imaging range of the driver monitoring camera due to the position change of the steering wheel.

Here, FIG. 2 is a diagram for explaining the change in the imaging range of the driver monitoring camera 1 due to the position change of the steering wheel. FIG. 2 shows a driver 50, a steering wheel 20, the driver monitoring camera 1, and the imaging range PA of the driver monitoring camera 1. The steering wheel 20 has a position change mechanism that allows the position of the steering wheel 20 to be changed relative to the vehicle. The position of the steering wheel 20, the driver monitoring camera 1, and the imaging range PA after the position change are shown by dashed lines.

As shown in FIG. 2, when the driver monitoring camera 1 is provided integrally with the steering wheel 20, the imaging range PA of the driver monitoring camera 1 with respect to the driver 50 changes significantly when the driver 50 changes the position of the steering wheel 20. As a result, in the conventional driver state determination apparatus, the position of the driver's face in the image captured by the driver monitoring camera 1 changes significantly before and after the position change of the steering wheel 20, which may take time to determine the state of the driver 50 using the captured image.

Therefore, when the driver state determination unit 13 determines that a position change of the steering wheel 20 has been performed, it estimates the position of the driver's face in the image after the position change based on the position of the driver's face in the image before the position change of the steering wheel 20 and the position change information of the steering wheel 20. As shown in FIG. 2, since there is a relationship between the position change of the steering wheel 20 and the change in the imaging range PA of the driver monitoring camera 1, the driver state determination unit 13 estimates the position of the driver's face in the image after the position change using, for example, an image processing program. The image processing program may be prepared in advance to estimate the change in the position of the driver's face in the image from the position change information of the steering wheel 20.

The driver state determination unit 13 determines the state of the driver from the estimated position of the driver's face and the image after the position change. Specifically, the driver state determination unit 13 performs face recognition processing on a predetermined range including the estimated position of the driver's face instead of the entire image, thereby recognizing the state of the driver's face in a shorter time compared to performing face recognition processing on the entire image. The driver state determination unit 13 determines the state of the driver, such as a distracted state, from the recognized state of the driver's face.

In addition, the driver state determination unit 13 may maintain the determination result of the driver's state immediately before the determination when the driver recognition range determination unit 12 determines that the steering wheel 20 has deviated from the driver recognition range. A case where the steering wheel deviates from the driver recognition range is, for example, when the driver accidentally releases the position lock of the steering wheel 20 and the steering wheel 20 drops down. The case where the steering wheel 20 deviates from the driver recognition range may include a case where the driver accidentally moves the steering wheel 20 to a position where it is difficult to operate the steering wheel during the position adjustment of the steering wheel 20.

When the steering wheel 20 deviates from the driver recognition range, the driver state determination unit 13 maintains the determination result before the steering wheel 20 deviates from the driver recognition range to avoid making an incorrect determination of the driver's state because the driver's face is likely to be out of the imaging range of the driver monitoring camera 1.

When the driver recognition range determination unit 12 determines that the steering wheel 20 has deviated from the driver recognition range, the driver state determination unit 13 outputs a position return notification to the driver as a voice via the HMI 3. The position return notification prompts the driver to return the steering wheel 20 to its original position. The position return notification is, for example, a voice notification that informs the driver to return the position of the steering wheel 20 to a normal range.

The driver state determination unit 13 may determine whether the state of the driver is an abnormal driver state based on the image captured by the driver monitoring camera 1. The abnormal driver state is a state in which it can be inferred that the driver cannot continue to operate normally. The driver state determination unit 13 determines that the driver is in an abnormal driver state, for example, when the driver's face suddenly looks down and the driver's posture collapses. The driver state determination unit 13 determines that the driver is in an abnormal driver state, for example, when the driver's face abruptly looks down and the driver's posture slumps. The driver state determination unit 13 may determine that the driver is in an abnormal driver state when the driver's head suddenly moves backward and after hitting the headrest, and the driver's face remains upward for a certain period of time.

In addition, the driver state determination unit 13 may make it less likely to determine that the state of the driver is an abnormal driver state when a position change of the steering wheel 20 is performed compared to when the position change of the steering wheel 20 is not performed. When a position change of the steering wheel 20 is performed, the position of the driver monitoring camera 1 also changes, which reduces the accuracy of the determination of the driver's state, so making it less likely to determine that the state of the driver is an abnormal driver state can suppress incorrect determinations.

Specifically, the driver state determination unit 13 may make it less likely to determine that the state of the driver is an abnormal driver state by changing the angle determination threshold for the face orientation used for abnormal determination to a larger value, for example. The driver state determination unit 13 may make it less likely to determine that the state of the driver is an abnormal driver state by changing the threshold for the duration of the driver's face being upward used for abnormal determination to a longer time.

Figure 3:
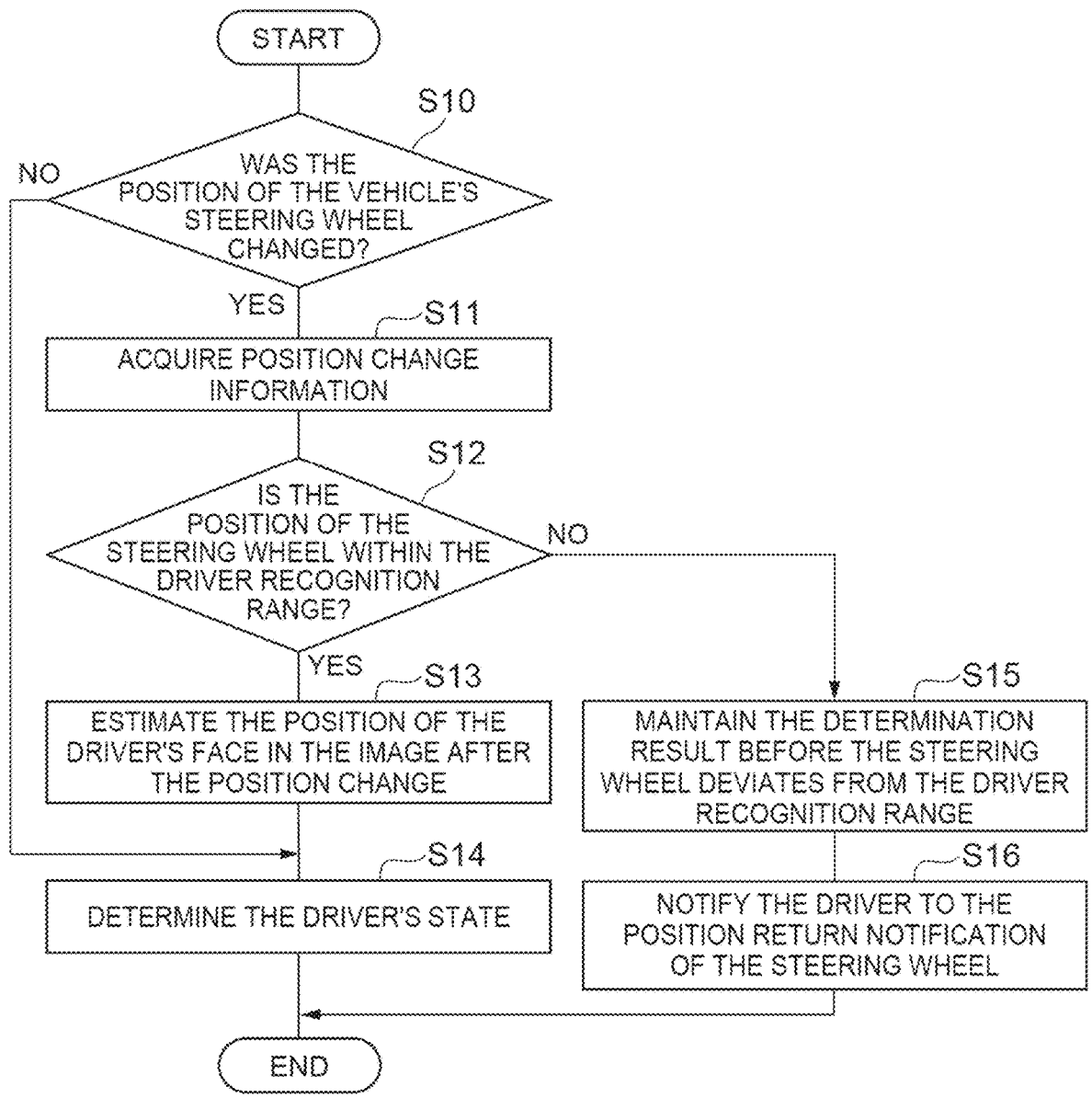
FIG. 3 is a flowchart showing an example of the driver state determination process based on the position change of the steering wheel.

Next, the control of the driver state determination apparatus 100 will be described with reference to FIG. 3 and FIG. 4. FIG. 3 is a flowchart showing an example of the driver state determination process due to the position change of the steering wheel 20.

As shown in FIG. 3, the ECU 10 of the driver state determination apparatus 100 determines whether a position change of the steering wheel 20 of the vehicle has been performed with the position change information acquisition unit 11 in S10. The position change information acquisition unit 11 makes the above determination based on the steering position information detected by the steering position detection unit 2. When the ECU 10 determines that a position change of the steering wheel 20 has been performed, it moves to S11. When the ECU 10 determines that a position change of the steering wheel 20 has not been performed, it moves to S14.

In S11, the ECU 10 acquires the position change information of the steering wheel 20 with the position change information acquisition unit 11.

In S12, the ECU 10 determines whether the position of the steering wheel 20 has deviated from the driver recognition range with the driver recognition range determination unit 12. The driver recognition range determination unit 12 makes the above determination based on the steering position information detected by the steering position detection unit 2. When the ECU 10 determines that the position of the steering wheel 20 has not deviated from the driver recognition range, it moves to S13. When the ECU 10 determines that the position of the steering wheel 20 has deviated from the driver recognition range, it moves to S15.

In S13, the ECU 10 estimates the position of the driver's face in the image after the position change with the driver state determination unit 13. The driver state determination unit 13 estimates the position of the driver's face based on the position of the driver's face in the image before the position change of the driver monitoring camera 1 and the position change information of the steering wheel 20.

In S14, the ECU 10 determines the state of the driver with the driver state determination unit 13. When the determination in S10 is NO, the driver state determination unit 13 determines the state of the driver by performing normal face recognition processing of the driver based on the image captured by the driver monitoring camera 1. The normal face recognition processing of the driver is a process of recognizing the driver's face from the current captured image based on the position of the driver's face recognized in the captured image used for the previous determination of the driver's state.

Similarly, in S14, when the driver state determination unit 13 goes through S13, it determines the state of the driver from the estimated position of the driver's face in S13 and the image after the position change. The driver state determination unit 13 determines the state of the driver, such as a distracted state or a drowsy state. The driver state determination unit 13 may issue a warning to the driver via the HMI 3 based on the determination result. Thereafter, the ECU 10 ends the driver state determination process.

In S15, the ECU 10 maintains the determination result before the steering wheel 20 deviates from the driver recognition range with the driver state determination unit 13. If this is the first determination after the ignition of the vehicle is turned on, the driver state determination is not performed.

In S16, the ECU 10 outputs a position return notification to the driver via the HMI 3 to prompt the driver to return the position of the steering wheel 20 with the driver state determination unit 13. Thereafter, the ECU 10 ends the driver state determination process.

Figure 4:
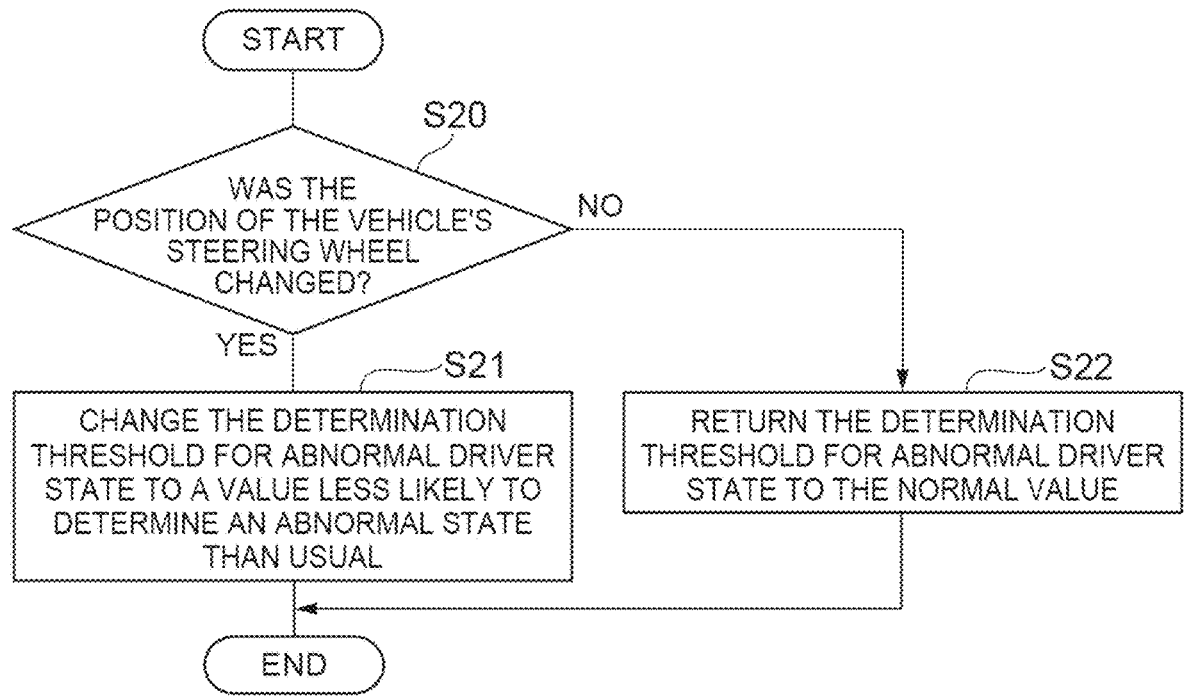
FIG. 4 is a flowchart showing an example of the threshold change process for abnormal state determination due to the position change of the steering wheel.

FIG. 4 is a flowchart showing an example of the threshold change process for abnormal state determination due to the position change of the steering wheel 20. As shown in FIG. 4, the ECU 10 determines whether a position change of the steering wheel 20 of the vehicle has been performed with the position change information acquisition unit 11 in S20. When the ECU 10 determines that a position change of the steering wheel 20 has been performed, it moves to S21. When the ECU 10 determines that a position change of the steering wheel 20 has not been performed, it moves to S22.

In S21, the ECU 10 changes the determination threshold for abnormal driver state determination to a value less likely to determine an abnormal state with the driver state determination unit 13. The driver state determination unit 13 may change the threshold for the duration of the driver's face being upward used for abnormal determination to a shorter time. Thereafter, the ECU 10 ends the current threshold change process.

In S22, the ECU 10 returns the determination threshold for abnormal driver state determination to the normal value if it had been changed to a value more likely to determine an abnormal state. If the determination threshold is already at the normal value, the ECU 10 may skip the process in S22. Thereafter, the ECU 10 ends the current threshold change process.

According to the driver state determination apparatus 100 of the present embodiment described above, since the position of the driver's face in the image after the position change is estimated using the position change information of the steering wheel 20 when the position of the steering wheel 20 provided with the driver monitoring camera 1 is changed, it is possible to suppress the time taken to determine the state of the driver compared to performing face image recognition processing on the entire image to find the position of the driver's face after the position change.

Moreover, according to the driver state determination apparatus 100, when it is determined that the steering wheel 20 has deviated from the driver recognition range due to the position change, the determination result before the steering wheel 20 deviated from the driver recognition range is maintained, so it is possible to avoid making an incorrect determination of the driver's state when the driver's face is out of the imaging range of the driver monitoring camera 1. Additionally, in the driver state determination apparatus 100, when it is determined that the steering wheel 20 has deviated from the driver recognition range, a position return notification is output as a voice notification to the driver to inform the driver that the position of the steering wheel 20 is inappropriate.

Furthermore, in the driver state determination apparatus 100, when a position change of the steering wheel 20 is performed, it is made less likely to determine that the state of the driver is an abnormal driver state compared to when the position change of the steering wheel 20 is not performed. Since the position of the driver monitoring camera 1 also changes when a position change of the steering wheel 20 is performed, the accuracy of the determination of the driver's state decreases, so making it less likely to determine that the state of the driver is an abnormal driver state can suppress incorrect determinations.

Although embodiments of the present disclosure have been described above, the present disclosure is not limited to the above-described embodiments. The present disclosure can be implemented in various forms in which various changes and improvements are made based on the knowledge of those skilled in the art as well as the above-described embodiments.

For example, the ECU 10 does not necessarily need to have the driver recognition range determination unit 12. Also, the voice output of the position return notification is not essential.

What is claimed is:

1. A driver state determination apparatus that determines the state of a driver's face of a vehicle based on an image captured by a driver monitoring camera provided for a steering wheel of the vehicle, the apparatus comprising:
   a driver state determination unit that determines the state of the driver based on the image captured by the driver monitoring camera; and
   a position change information acquisition unit that acquires position change information of the steering wheel when a position change of the steering wheel is performed,
   wherein the driver state determination unit estimates the position of the driver's face in the image after the position change based on the position of the driver's face in the image before the position change of the steering wheel and the position change information of the steering wheel, and determines the state of the driver from the estimated position of the driver's face and the image after the position change.

2. The driver state determination apparatus according to claim 1, further comprising a driver recognition range determination unit that determines whether the steering wheel has deviated from a preset driver recognition range due to the position change when the position change of the steering wheel is performed, wherein the driver state determination unit maintains the determination result of the driver's state immediately before the determination of the driver recognition range determination unit when the driver recognition range determination unit determines that the steering wheel has deviated from the driver recognition range.

3. The driver state determination apparatus according to claim 2, wherein a position return notification is output as a voice notification to the driver to prompt the driver to return the position of the steering wheel when the driver recognition range determination unit determines that the steering wheel has deviated from the driver recognition range.

4. The driver state determination apparatus according to claim 3, wherein the driver state determination unit determines whether the state of the driver is an abnormal driver state based on the position change information of the steering wheel and the image captured by the driver monitoring camera, and makes it less likely to determine that the state of the driver is an abnormal driver state when the position change of the steering wheel is performed compared to when the position change of the steering wheel is not performed.

5. The driver state determination apparatus according to claim 2, wherein the driver state determination unit determines whether the state of the driver is an abnormal driver state based on the position change information of the steering wheel and the image captured by the driver monitoring camera, and makes it less likely to determine that the state of the driver is an abnormal driver state when the position change of the steering wheel is performed compared to when the position change of the steering wheel is not performed.

6. The driver state determination apparatus according to claim 1, wherein the driver state determination unit determines whether the state of the driver is an abnormal driver state based on the position change information of the steering wheel and the image captured by the driver monitoring camera, and makes it less likely to determine that the state of the driver is an abnormal driver state when the position change of the steering wheel is performed compared to when the position change of the steering wheel is not performed.

* * * * *